Jan. 28, 1947.   S. J. CROCKETT   2,414,932
LIGHTING SYSTEM FOR AUTOMOBILES OR THE LIKE
Filed Dec. 6, 1945
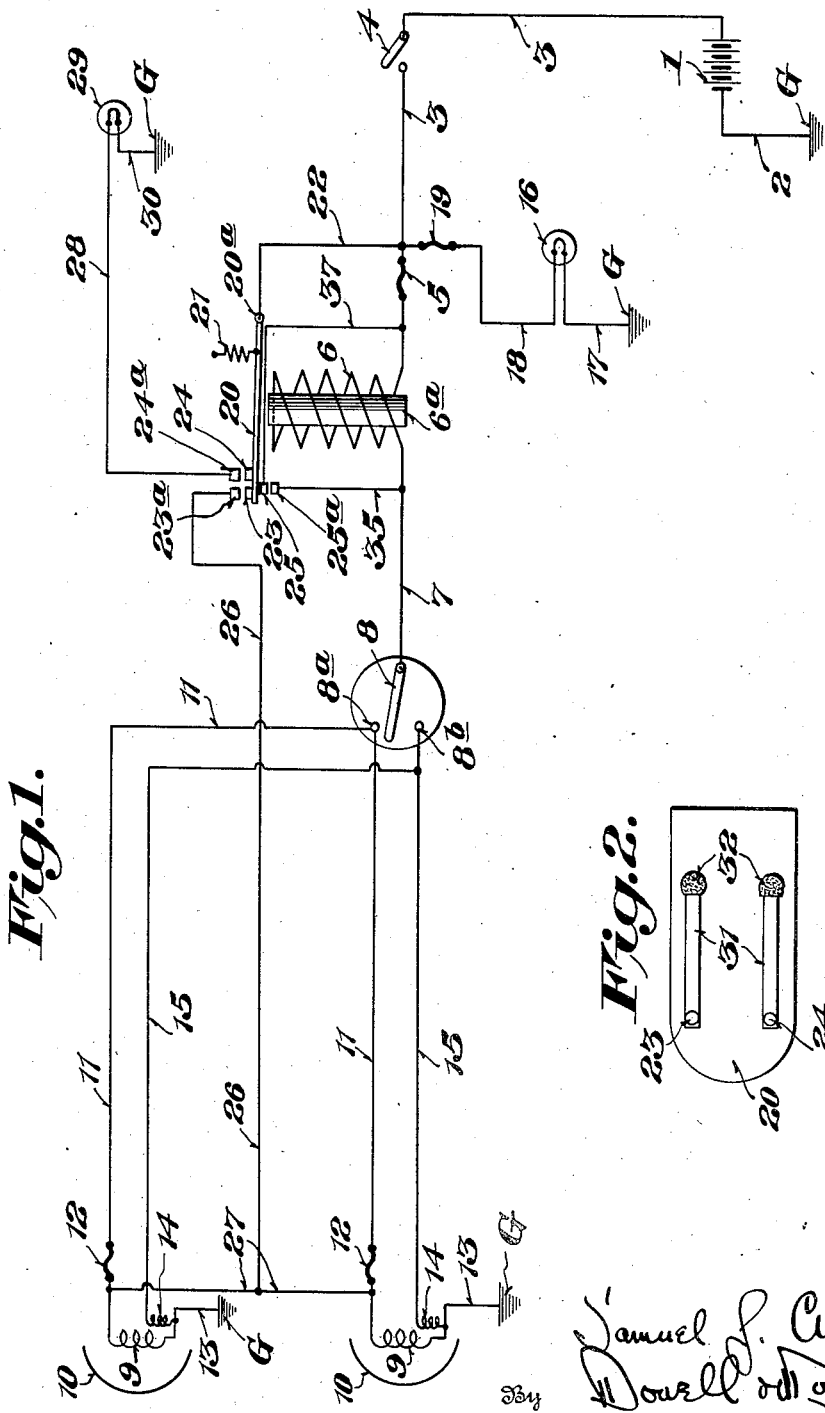

Patented Jan. 28, 1947

2,414,932

UNITED STATES PATENT OFFICE 2,414,932

LIGHTING SYSTEM FOR AUTOMOBILES OR THE LIKE

Samuel J. Crockett, Quinwood, W. Va.

Application December 6, 1945, Serial No. 633,148

14 Claims. (Cl. 315—82)

1

This invention relates to new and useful improvements in lighting systems for motor vehicles or the like, and especially to a safety feature for automatically transferring the electrical energy from a dead or grounded line, caused by a blown-out fuse or a short-circuit, to a safety feeder line, which in turn conducts the electric current unhindered to the same conventional headlight—preferably the modern sealed-beam unit—the headlight thus being restored to normal functioning, permitting the operator to have clear vision at night for stopping or for proceeding safely to a repair station.

The present application is a substitute for my prior copending application, Serial No. 626,373, filed November 2, 1945.

While driving at night, as the operator of a vehicle is constantly looking at the lighted road, his eyes become adjusted to the lights. If the lights should suddenly go out from any cause, the road appears darker to him than it actually is at the particular moment, and many wrecks are caused in this manner, resulting in untold casualties and property damage. My invention, therefore, will eliminate a greater part of this type of accident by the installation of an automatic power relay and safety transfer switch in the lighting circuit of motor vehicles, same providing in combination with the normal lighting circuit a safety feeder line and a unique arrangement of safety line fuses.

This invention is illustrated in the accompanying drawing, wherein:

Fig. 1 shows a wiring diagram for an automobile using two sealed-beam headlight units, a standard dimmer switch, and my novel combination power relay and automatic safety transfer switch, connected in circuit with the battery which supplies the electrical energy to operate the lighting system.

Fig. 2 is a top view of the armature of the safety transfer switch armature detached, showing two fixed contact points mounted at one end of a pair of flat springs.

As shown in Fig. 1, one terminal of battery 1 is grounded by conductor 2 to the frame of the vehicle G, the other terminal of battery 1 being connected by conductor 3 through master switch 4 and through a safety fuse 5 to one terminal of a relay coil 6, the other terminal of coil 6 being connected by conductor 7 to a conventional foot-operated double throw switch 8 which opens and closes the circuit through conductors 11 through the main filaments 9 of head lamps 10 when the switch 8 is engaged with contact 8a, fuses 12

2 being interposed in conductors 11 as close to the head lamps 10 as feasible. The main filaments of 9 are further grounded through conductors 13 to the frame of the vehicle G which frame forms the return circuit to battery 1. The dimmer filaments 14 of head lamps 10 are connected by wires 15 directly to the other contact 8b of switch 8, no fuses being interposed in conductors 15.

The tail lamp and the usual dash or instrument lamps indicated at 16 are grounded to the vehicle frame G through conductor 17, and are further connected by conductors 18 through safety fuses 19 to the conductor 3 between main switch 4 and the main fuse 5, as shown.

The above parts constitute the main or normal vehicle lamp circuit according to my invention, and when main switch 4 is closed the tail lamp 16 and the main filaments 9, or dimmer filaments 14 of the head lamps 10 will be activated or illuminated depending upon the setting of the switch 8, and this lamp circuit is normally the one used during night operation of the vehicle.

My novel safety feature of the circuit includes an automatic auxiliary circuit consisting of the armature 20 of the relay coil 6, said armature being of conducting material and being hinged at 20a to a fixed support, said armature being normally retracted away from the coil 6 by means such as a spring 21. The hinged end of armature 20 is connected by conductor 22 to the conductor 3 between the main switch 4 and the safety fuse 5. The outer end of armature 20 carries contacts 23 and 24 on its upper or outer side, and a contact 25 on its lower or inner side. Associated with the contacts 23, 24 and 25 are relatively fixed contacts 23a, 24a, and 25a respectively. When current passes through the relay coil 6 the armature 20 is attracted towards the coil, and contacts 25 and 25a are closed, thereby opening the contacts 23—23a and 24—24a respectively.

Contact 25 is insulated from armature 20 and is connected by conductor 37 to the conductor 3 between fuse 5 and solenoid coil 6 as shown in Fig. 1, so as to throw the entire overload on fuse 5 regardless of where a ground develops in the circuit to give instant results. Without insulating the contact 25 and providing therefor the conductor 37 thus connected, in event of a ground, too long a time would be required for fuse 5 to blow out since most of the strain would be imposed on conductor 22 instead of fuse 5. The associated fixed contact 25a is connected to conductor 7 by wire 35 intermediate switch 8 and solenoid coil 6.

Contact 23a is connected by conductor 26 having a pair of branches 27 adjacent the head lamps 10 connected directly with the conductors 11 of the main filaments 9 of said head lamps between the filaments 9 and the safety fuses 12, as clearly shown in Fig. 1. The contact 24a is connected by conductor 28 with a warning lamp 29 preferably mounted on the dashboard or other portion of the vehicle within ready vision of the operator, said lamp being grounded to the vehicle frame G through a conductor 30. Contact 25a is connected by conductor 35 to the conductor 7 between coil 6 and switch 8.

The contacts 23 and 24 on the upper or outer face of armature 20 are preferably formed of arc-resisting metal and are preferably carried on the outer free ends of flat spring steel conductors 31, the fixed ends of springs 31 being connected to the armature 20 by welding or soldering as at 32, whereby the outer free ends of the springs 31 will permit a slight adjustment of the position of contacts 23, 24 or armature 20 to insure positive engagement of contacts 23 and 24 with their related fixed contacts 23a—24a when the current through the relay coil 6 is interrupted, and in event the armature 20 should accidentally become slightly out of proper alignment. Contacts 23a—24a moreover may, if desired, be adjustable or provided with means to maintain same in proper adjustment as the working space or clearance between the contacts 23—23a and 24—24a need not be more than about $\frac{1}{32}$ of an inch.

Contact 25a may be adjustable so that when coil 6 is energized and attracts armature 20, contact 25a will be completely closed and not permit a clearance between the core of coil 6 and armature 20 greater than $\frac{1}{64}''$. This will insure more pull against the armature 20 and cause better connection for contact point 25a and will greatly eliminate the drag of coil 6 on the light circuit when head lamps 10 are burning.

In normal operation, the headlights 10 are turned on by merely closing switch 4 which is usually located on the instrument panel. When switch 4 is closed, the electric current follows conductor 3 passing through fuse 5 and relay coil 6 and out from the coil 6 to the foot switch 8, and then to either the bright filaments 9 through conductors 11 and fuses 12, or to the dimmer filaments 14 through conductors 15, depending upon the setting of switch 8. At the same time, current flows through conductor 37 to contact 25. However, when the current passes through relay coil 6, it creates a magnetic force which attracts armature 20 thereby closing the contacts 25—25a permitting most of the electrical energy to by-pass relay coil 6 thus eliminating a heavy drain on the light circuit to head lamps 10 by following circuit 37—25—25a thence through conductor 35 back to the conductor 7, on the far side of the relay coil 6.

There is no special need for the arrangement of a safety feeder line to the tail light and the usual dash or instrument lights 16 of the circuit since these are not used by the driver for illumination purposes when stopping, should the headlights 10 suddenly fail. However, if the ground on the circuit develops anywhere else except on the tail or instrument panel circuit 18 through fuse 19 to lamp 16, the tail lights 16 will remain illuminated.

Under normal driving conditions when meeting oncoming vehicles, the dimmer switch 8 may be depressed to dim the lights, or left to complete the bright beam circuit 11 and the automatic transfer switch will function properly on either circuit.

Fuses 12 are preferably of glass encased capsule-type and are fitted into an insulated metal shell, which can be opened for replacements, soldered directly in the bright circuit 11, and they are located as near the sockets of the headlights as possible without interfering with the lamp housing. By locating them near the lamps 10 it allows more of the circuit to be protected against short-circuits. And likewise, the automatic transfer switch should be located as near main switch 4 or the source of electric current as practical for the same reason of extending the amount of circuit protection.

Safety feeder line 26 is connected between headlamps 10 and fuses 12. When a ground or short-circuit develops anywhere in the circuits 11 or 15 between the fuses 12 and 5, fuse 5 will blow out. This in turn will deenergize coil 6, permitting spring 21 to raise armature 20 upwardly against contact points 23a and 24a, allowing electric current to flow to warning light 29 through conductor 28, and also allows current to flow through safety feeder line 26, thence through fuses 12 and back to the ground or short-circuit, which will instantly blow out the particular fuse 12 that happens to be on the line 11 which is grounded. This action automatically insulates safety feeder line 26 from the grounded area. In the event the short circuit is on the dim circuits 15, it can in no way interfere with the operation of headlights 10, because the automatic transfer switch is then in operation, feeding the current through safety feeder line 26, which must pass through the bright filaments 9 of the head lamps 10 before reaching the ground on circuit 15; then it is too late to reach it, as the job has already been accomplished.

Short circuits or grounds are not necessarily the only cause of light failure or fuses blowing out. More than likely, it will be caused by overloading the fuse capacity of the light circuit. This is usually done by an apprentice or inexperienced mechanic attaching extra equipment such as fog-lights, heaters, radios, etc., on the fuse-controlled light circuit, which will overload the fuse when all the equipment is turned on at the same time. When this happens, the fuse blows, leaving the operator in the dark. However, with the automatic transfer switch connected in line as shown in Fig. 1, the switch will give the same protection by turning the lights back on again as described above, when a ground or short-circuit develops.

Warning light 29 is preferably a small red light located on the instrument panel of the vehicle, and when the circuit is functioning properly, this light does not burn. When an overload comes on the fused circuit between fuses 12 and 5, said fuse 5 will blow out, causing coil 6 to become deenergized and armature 20 to transfer current through contact point 24a to warning light 29, which will attract the attention of the operator and advise him that a fuse has blown out so he can proceed with caution until same can be repaired.

It will be noted that connector 22 which conducts the electric current to the safety feeder line 26 through contact point 23a is connected directly in front of fuse 5; and that there is no fuse whatsoever in safety feeder line 26. This connection is so made as to insure electrical energy through feeder 26 after the main current has been broken at fuse 5. To fuse this safety line would defeat the purpose of installing this automatic safety transfer switch, because the fuse might blow under a heavy strain in the same manner as 5; and the possibility of getting a ground or short-circuit on the conventional light circuit and the safety circuit at the same time is very remote.

From the foregoing description, it can be seen that an exceptionally simple and self-contained device has been provided that can greatly enhance the safety of the highways for night motorists. While I have shown one form and one particular use for this device, it is to be understood that the same can be used for numerous other purposes, such as controlling machinery automatically, and the number of operations to be controlled will depend on the number of individual contact points and size and use to which it is to be subjected.

I claim:

1. In combination, a lighting system or the like, including a source of electric current, and including one or more lamps having bright and dimmer filaments respectively, one terminal of each of which is connected by first and second conductors to a selector switch, which switch is connected through a third conductor to a master switch connected with one terminal of the source of electric current, the other terminals of said filaments and battery being grounded to a common return conductor; a relay coil in said third conductor between the selector and master switches; an armature of electrically conductive material adapted to be actuated by the coil; means normally urging the armature away from the coil; a safety fuse in the third conductor adjacent the master switch; a fixed contact adapted to be engaged by said armature when the coil is excited, said contact being connected with the third conductor between the coil and selector switch; a second fixed contact adapted to be engaged with the armature when the coil is deenergized, said second contact being connected to the first conductors of the bright filaments adjacent said bright filaments other safety fuses in said connections to the first conductors adjacent said lamps respectively; and a fourth conductor connecting the armature with the third conductor between the fuse and master switch.

2. In a combination as set forth in claim 1, a third fixed contact adapted to be contacted by the armature when the coil is deenergized; and a warning lamp having one terminal connected to the third contact and its other terminal grounded.

3. In a combination as set forth in claim 1, a tail lamp having one terminal connected by a fifth conductor with the third conductor between the coil and master switch, and its other terminal grounded; and a third safety fuse in said fifth conductor.

4. In a combination as set forth in claim 1, said armature having contact points mounted on leaf springs of conductor material united at one end respectively to the armature, said contact points cooperating with the said fixed contacts respectively.

5. In combination, a lighting system for motor vehicles or the like, including a source of electric current and including one or more headlamps having bright and dimmer filaments respectively, one terminal of each of which is connected by first and second conductors to a selector switch which switch is connected through a third conductor to a master switch connected with one terminal of the source of electric current, the other terminals of said filaments and battery being grounded to the vehicle frame; a relay coil in said third conductor between the selector and master switches; an armature of electrically conductive material adapted to be actuated by the coil; means normally urging the armature away from the coil; a safety fuse in the third conductor adjacent the master switch; a fixed contact adapted to be engaged by said armature when the coil is excited, said contact being connected with the third conductor between the coil and selector switch; a second fixed contact adapted to be engaged with the armature when the coil is deenergized, said second contact being connected to the first conductors of the bright filaments adjacent said bright filaments other safety fuses in said connections to the first conductors adjacent said lamps respectively; and a fourth conductor connecting the armature with the third conductor between the fuse and master switch.

6. In a combination as set forth in claim 5, a movable contact insulated from and mounted on said armature and adapted to contact said fixed contact when the coil is energized, said movable contact being connected by a further conductor with the third conductor between the main fuse and the coil.

7. In a combination as set forth in claim 5, a third fixed contact adapted to be contacted by the armature when the coil is deenergized; and a warning lamp having one terminal connected to the third contact and its other terminal grounded.

8. In a combination as set forth in claim 5, a tail lamp having one terminal connected by a fifth conductor with the third conductor between the first safety fuse and master switch, and its other terminal grounded; and a second safety fuse in said fifth conductor.

9. In a combination as set forth in claim 5, said armature having contact points mounted on leaf springs of conductive material united at one end respectively to the armature, said contact points cooperating with the said fixed contacts respectively.

10. In combination, a lighting system for motor vehicles or the like, including a source of electric current and including one or more headlamps having bright and dimmer filaments respectively, one terminal of each of which is connected by first and second conductors to a selector switch which switch is connected through a third conductor to a master switch connected with one terminal of the source of electric current, the other terminals of said filaments and battery being grounded to the vehicle frame; a relay coil in said third conductor between the selector and master switches; an armature of electrically conductive material adapted to be actuated by the coil; means normally urging the armature away from the coil; a safety fuse in the third conductor adjacent the master switch; a second fuse or fuses with separate conductors for the bright filaments adjacent the head lamps; a fixed contact adapted to be engaged by said armature when the coil is excited, said contact being connected with the third conductor between the coil and selector switch; a second fixed contact adapted to be engaged with the armature when the coil is deenergized, said second contact being connected to the first conductors of the bright filaments between the said bright filaments and second fuses; and a fourth conductor connecting the armature with the third conductor between the first fuse and the master switch.

11. In a combination as set forth in claim 10, a movable contact insulated from and mounted on said armature and adapted to contact said fixed contact when the coil is energized, said movable contact being connected by a further conductor with the third conductor between the main fuse and the coil.

12. In a combination as set forth in claim 10, a third fixed contact adapted to be contacted by the armature when the coil is deenergized; and a warning lamp having one terminal connected to the third contact and its other terminal grounded.

13. In a combination as set forth in claim 10, a tail lamp having one terminal connected by a fifth conductor with the third conductor between the first safety fuse and master switch, and its other terminal grounded; and a third safety fuse in said fifth conductor.

14. In a combination as set forth in claim 10, said armature having contact points mounted on leaf springs of conductive material united at one end respectively to the armature, said contact points cooperating with the said fixed contacts respectively.

SAMUEL J. CROCKETT.